United States Patent Office 3,542,656
Patented Nov. 24, 1970

3,542,656
PRODUCTION OF CYCLOHEXADIENE DICARBOXYLIC ACIDS
Hubert Suter, Heinz Nohe, Fritz Beck, Werner Bruegel, and Heinz Aschenbrenner, Ludwigshafen (Rhine), Germany, assignors to Badische Anilin- & Soda-Fabrik Aktiengesellschaft, Ludwigshafen (Rhine), Germany
No Drawing. Filed Jan. 8, 1968, Ser. No. 696,136
Claims priority, application Germany, Jan. 11, 1967, 1,618,078
Int. Cl. B01k 1/00; C07b 1/00
U.S. Cl. 204—73          10 Claims

ABSTRACT OF THE DISCLOSURE

Production of 3,5-cyclohexadine-1,2-dicarboxylic acid or 2,5-cyclohexadiene-1,4-dicarboxylic acid by electrochemical hydrogenation of o-phthalic acid or terephthalic acid at a temperature of up to 80° C. and with a current density of from 1 to 40 A./dm.$^2$ in mixtures of dilute aqueous sulfuric acid and an inert organic solvent which is liquid at low temperature and which is selected from the group consisting of ethers, carboxylic amides and nitriles. The products are suitable for the production of varnishes.

---

It is known that 3,5-cyclohexadine-1,2-dicarboxylic acid can be prepared by partial electrochemical hydrogenation of o-phthalic acid in dilute sulfuric acid as catholyte at temperatures above 70° C. According to Ber., 39, 2933 to 2942 (1906) and according to "Zeitschrift für Elektrochemie," 35, 769 to 779 (1929) the reaction is carried out over specially prepared maximum-purity lead cathodes in 15% sulfuric acid. In U.S. patent specification No. 2,477,579 and 2,477,580 the disadvantages of lead cathodes are enumerated and therefore the use of mercury cathodes and 5% sulfuric acid is recommended. Moreover in U.S. patent specification No. 2,537,304 apparatus is described which is conductive to the avoidance of poisoning phenomena. When using lead cathodes, poisoning occurs which results in greatly decreased reactivity. Moreover brown, tarry byproducts form which discolor the reaction product and make purification necessary. Mercury also results in poisoning, although not until after some time. It is therefore necessary to remove the mercury continuously from the hydrogenation unit, purify it and recycle the purified mercury. It is thus necessary to use a mercury cycle in which at least one purification stage is interposed. In this way the reducing power of the cathodes is maintained, but a complicated method is required to carry on the electrochemical process for a prolonged period. Moreover in consequence of the physiological hazard in using mercury and especially in operating a mercury cycle, special precautions have to be observed.

As the following table shows, temperatures of more than 80° C. are required in the conventional processes in order to achieve a phthalic acid concentration in the catholyte which is adequate industrially.

TABLE
Solubility of o-phthalic acid in 5% sulfuric acid:

| Temperature in ° C.: | Grams of p-phthalic acid in 100 g. of 5% sulfuric acid |
| --- | --- |
| 25 | 0.20 |
| 35 | 0.40 |
| 45 | 0.86 |
| 55 | 1.28 |
| 65 | 1.78 |
| 75 | 2.76 |
| 85 | 4.95 |

A phthahlic acid concentration and consequently a depolarizer concentration of only 4% to a maximum of 5% in the catholyte is rather low for electrochemical reductions. In consequence undesirably high concentration polarizations occur at the cathode, particularly at high current densities such as are necessary in the interest of a high throughput, high space-time yields and correspondingly small apparatus. The current and energy yields (increase in the decomposition potential) are unfavorably affected, i.e. decreased. Measurement of the current-voltage curves show that as the concentration of phthalic acid decreases, for example from 25 to 5% by weight, the current-voltage curves are displaced toward more negative values as compared with the fundamental curve (absence of phthalic acid, development of hydrogen). The potential-time curve also becomes more negative with increase in time and higher current density.

Another disadvantage of low solubility is that a large amount of liquid has to be handled (for the processing of which uneconomically large equipment is required) in order to achieve high space-time yields and a high capacity of the hydrogenation cells.

The high reaction temperatures required for the said process are very detrimental as regards the stability of the 3,5-cyclohexadiene-1,2-dicarboxylic acid formed. It is known from the literature (including A. v. Baeyer, A. 269, 190 (1892)) that it undergoes rearrangement in the presence of acids or alkalies, particularly at high temperature. 2,6-cyclohexadiene-1,2-dicarboxylic acid is mentioned by v. Baeyer and also in U.S. patent specifications Nos. 2,477,579, 2,477,580 and 2,537,304 as a rearrangement product. According to more recent investigations (J. Am. Chem. Soc. 87, 1930/1 (1965)) the rearrangement product in question is 2,5-cyclohexadiene-1,2-dicarboxylic acid. This discovery has been confirmed by ultraviolet and nuclear resonance investigations.

It is an object of the present invention to provide a process for the production of 3,5-cyclohexadiene-1,2-dicarboxylic acid or 2,5-cyclohexadiene-1,4-dicarboxylic acid by electrochemical hydrogenation of the corresponding phthalic acids in which high concentrations of the phthalic acids can be used and in which therefore high current densities and high yields are achieved. It is another object of the invention to provide a process according to which 3,5-cyclohexadiene-1,2-dicarboxylic acid or 2,5-cyclohexadiene-1,4-dicarboxylic acid can be manufactured in high purity. A futher object of the invention is to provide a process of the said kind in which no poisoning of the electrodes takes place for prolonged period. Finally it is an object of the invention to provide an electrochemical process of the said kind in which no special material is necessary for the electrodes.

We have found that 3,5-cyclohexadiene-1,2-dicarboxylic acid and 2,5-cyclohexadiene-1,4-dicarboxylic acid can be obtained more advantageously than hitherto by electrochemical hydrogenation of o-phthalic acid or terephthalic acid in dilute aqueous sulfuric acid at temperatures of up to 80° C., particularly below 70° C., and at current densities of 1 to 40 amperes per square decimeter using conventional cathodes, by adding to the catholyte as a solvent an ether, amide and/or nitrile which is miscible with water, liquid at room temperature and inert under the reaction conditions.

In the process according to this invention, the electrochemical partial hydrogenation of o-phthalic acid into 3,5-cyclohexadiene-1,2-dicarboxylic acid can be carried out with a phthalic acid concentration in the catholyte of up to 50%, using conventional untreated cathodes, for example of lead, with high current densities and high yields of 3,5-cyclohexadiene-1,2-dicarboxylic acid of up to 99.2% of the theory and with a content of less than 1% of 2,5-cyclohexadiene-1,2-dicarboxylic acid.

It is already known that the solubility of an organic compound to be reduced can be increased by adding organic solvents to the catholyte, and a conducting salt may be used in a practically anhydrous system or alcohol in an acid aqueous electrolyte. It is stated in Zeitschrift für Elektrochemie, 35, pages 771, 774 and 775 (1929) however, that the electrochemical hydrogenation of phthalic acid takes an unfavorable course when alcohol is added, in that more rapid poisoning of the lead cathode takes place than in the absence of alcohol. Moreover the yield of 3,5-cyclohexadiene-1,2-dicarboxylic acid decreases markedly; the by-products formed include 3,5-cyclohexadiene-1,2-dicarboxylic ester.

It is therefore surprising that when other organic solvents are used, not only is the yield of 3,5-cyclohexadiene-1,2-dicarboxylic acid increased, but no poisoning or fatigue of the cathodes takes place. It is not even necessary to use the cathode materials specified in the copending patent application: Ser. No. 624,129, namely amalgamated lead, cadmium, tin, thallium or bismuth or alloys from at least two of the metals lead, mercury, silver, cadmium, tin, thallium and bismuth, which may be amalgamated, or pure cadmium, tin or bismuth, because standard lead cathodes may be used without pretreatment with good success.

The fatigue of the cathodes may be measured by following the cathode potential at constant current density in dependence on time (potential-time curve). Whereas the potential remains constant in following the fundamental curve (without the addition of phthalic acid, development of hydrogen) it becomes increasingly more negative in the presence of 5% of o-phthalic acid in aqueous sulfuric acid as time elapses, and indeed the more rapidly the greater the current density is an even intersects the fundamental curve after a certain time. Parallel to this there is an increase in the development of hydrogen and a decrease in current yield as regards the formation of 3,5-cyclohexadiene-1,2-dicarboxylic acid.

If however the potential-time curve be measured for a catholyte having 20% of o-phthalic acid, 5% of sulfuric acid, water and one of the solvents to be used according to the invention, it is surprisingly found that the potential-time curve remains more positive than the fundamental curve at all times. The potential difference is about 150 to 200 millivolts and even increases slightly with time. In this case, therefore, there is no increase in the development of hydrogen. This potential difference between the fundamental curve and the current-potential curve is sufficient to avoid separation of hydrogen in large amounts.

These basic measurements in the two catholyte systems have thus demonstrated that the known poisoning of cathodes described in the literature (which is manifested in a displacement of the cathode potential in the negative direction) does not take place in the presence of the organic solvents to be used according to this invention even when the concentration of phthalic acid is high.

The new process is far superior to the prior art methods in aqueous sulfuric acid by reason of all the said advantages, namely: high acid concentration at temperatures below 70° C., no poisoning or fatigue of the cathodes, no rearrangement into 2,5-cyclohexadiene-1,2-dicarboxylic acid, no need to use conducting salts, high high yields of 3,5 - cyclohexadiene - 1,2 - dicarboxylic acid, high current yields, high space-time yields, and easy processing of small amounts of liquid.

The following table gives the solubilities (measured in grams of o-phthalic acid per 100 grams of an organic system consisting of 6.5% of $H_2SO_4$, 68.7% of an organic solvent according to this invention and 24.8% of water) of o-phthalic acid in three organic solvents according to the invention, namely: dioxane, tetrahydrofuran (THF) and dimethylformamide (DMF) at the temperatures indicated:

TABLE 1

| Temperature ° C.: | Dioxane | THF | DMF |
|---|---|---|---|
| 20 | 16.2 | 26.1 | 47.1 |
| 25 | 17.6 | 27.9 | 49.2 |
| 35 | 18.2 | 29.3 | 54.6 |
| 45 | 22.7 | 33.9 | 57.9 |

According to the present invention there is used as the catholyte a mixture with water and sulfuric acid of an ether, amide and/or nitrile which is liquid at room temperature, which is miscible with water and which is advantageously completely inert under the reaction conditions. Examples are: saturated cyclic ethers having five or six ring members and one or two ether groups, such as dioxane and tetrahydrofuran; monoethers or diethers of ethylene glycol or 1,2-propylene glycol, the alkyl radicals of the ether groups containing one to three carbon atoms, such as ethylene glycol monomethyl ether; N-monoalkyl substituted and N,N-dialkyl substituted amides of saturated aliphatic monocarboxylic acids having one to three carbon atoms whose alkyl groups contain one to three carbon atoms, such as methyl formamide, N-methylacetamide, N-ethylacetamide, dimethylformamide, diethylformamide or N,N-dimethylacetamide, other N,N-dialkylacetamides, N,N-dimethylpropionamide; N-alkyl substituted lactams (= cyclic amides) having five to six ring members and alkyl groups having one to three carbon atoms, such as N-methylpyrrolidone, N-ethylpyrrolidone, N-methylpiperidone and formamide; or nitriles of saturated aliphatic monocarboxylic acids having two to three carbon atoms, such as acetonitrile. The content of water and sulfuric acid in the catholyte is controlled so that good conductivity is ensured. As a rule the sulfuric acid content is 0.5 to 10% by weight, particularly 2 to 7% by weight, with reference to the whole system of water, sulfuric acid, aromatic carboxylic acid and organic solvent. Measurements of conductivity have shown that at a content of 3 to 5% by weight of sulfuric acid in these catholytes the maximum conductivity is set up. The water content of the catholytes is as a rule from 5 to 50% by weight, particularly from 10 to 30% by weight. The process may be carried out with the content of aromatic acid equivalent to maximum solubility. It is advantageous however to keep the concentration below saturation point in order to prevent crystallization in the metering pumps or pipelines. The concentration of aromatic carboxylic acid is advantageously from 15 to 40% by weight depending on the reaction temperature and the solvent used. In the interests of a high solubility of phthalic acid, the content of organic solvent should be as high as possible. On the other hand, however, care should be taken to ensure that the conductivity of the catholyte is not decreased. The concentration is as a rule from 20 to 80% by weight, particularly from 40 to 70% by weight. A mixture of organic solvents may also be used.

The process may be used for the partial electrochemical hydrogeneation of o-phthalic acid and terephthalic acid. Phthalic anhydride (which hydrolyzes to phtalic acid when dissolved in the catholyte) may be used instead of o-phthalic acid.

Dilute aqueous sulfuric acid whose concentration is preferably adjusted to be 1 to 30% by weight is used as a rule as the anolyte. It is favorable to use a concentration of the sulfuric acid in the anolyte which is somewhat higher than that in the catholyte, usually from 3 to 20% by weight.

The current density is from 1 to 40, preferably from 3 to 25, amperes per square decimeter. One of the main advantages of the new process lies in the possibility of maintaining lower reaction temperatures than in the methods hitherto known. The optimum reaction temperature may be considered to be that at which the maximum benzenecarboxylic acid concentration is ensured without any rearrangement reaction taking place. In principle the reaction may be carried out at lower temperatures, for example while removing heat by means of cooling brine, or at higher temperatures, for example up to the boiling temperature of the organic solvent used provided this boils below 80° C., for example tetrahydrofuran. It is possible for rearrangement of the 3,5 - cyclohexadiene-1,2-dicarboxylic acid formed into the corresponding 2,5-cyclohexadiene carboxylic acid to be substantially avoided by carrying out the process at temperatures lower than 80° C. The most favorable temperature range therefore is from 20° to 80° C., particularly from 25° to 70° C.

Since the reaction temperatures are below 80° C. it is possible to use as diaphragms (instead of the ceramic materials conventionally used) ion exchanger membranes, such as are known for example for the production of adiponitrile from U.S. patent application Ser. No. 542,255; these are not stable at temperatures above 80° C. Their advantage resides (a) in a lower electrical resistance than clay diaphragms and (b) in the fact that diffusion and permeation of organic substances are at a minimum. In the interests of an equalized pH balance in the electrode chambers, cation exchanger membranes are preferably used in the H(+) form.

Conventional electrodes may be used in the new process.

Lead or platinum metals are conventionally used as anodes. It is also possible however to use lead dioxide, graphite, silicon carbide, magnetic or other materials which are resistant or at least substantially resistant to anodic dissolution.

The cathodes may consist of the conventional cathode material. It is an advantage of the new process that it is not necessary to use specially prepared cathodes or special alloys. For example ordinary lead may be used with good results and without poisoning or fatigue phenomena without amalgamation or surface treatment (for example according to J. Tafel, Ber. 33,2209 (1900)). The cathodes described in prior copending application Ser. No. 624,129; namely amalgamated lead, cadmium, tin, thallium or bismuth or alloys of at least two of the metals lead, mercury, silver, cadmium, tin, thallium and bismuth, which may also be amalgamated, or pure cadmium, tin or bismuth, may also be used.

The new process may be carried out in conventional electrolytic equipment in which anode and cathode chambers are separated by a diaphragm. Thus the tubular cells described in greater detail in the examples may be made from glass, metal or plastics, the cathode if desired forming the inner wall of the cell. Instead of a tubular cell, it is possible to use cells shaped as troughs or chests. The cathodes and anodes may be plates arranged parallel to each other in the said cells. In this arrangement separation of the cathode chamber from the anode chamber may be effected particularly favorably by a membrane of an ion exchanger, plastics fabric or conventional ceramic materials such as porous clay. Removal of heat may be carried out by cooling means or by recycling of the catholyte and anolyte or, particularly advantageously, by constructing the electrodes as cooling means.

The hydrogenation may however also be carried out in other types of electrolytic equipment with or without diaphragms and with vibrating pairs of electrodes, as described in U.S. patent application Ser. No. 563,794 or by means of stationary pairs of electrodes through which the reaction mixture flows.

An advantage of this process is the relatively small cell voltage of 5 to 7 volts at current densities of from 20 to 25 A./dm.$^2$ even in systems which contain only 1% sulfuric acid. Particularly favorable results are obtained in the case of vibrating pairs of electrodes at low frequencies of 10 to 30 cycles per second. Thin amalgamated netting of brass or iron which has been galvanically coated with lead is suitable for the cathode, and platinum or titanium netting which has been coated with a layer of lead dioxide is suitable for the anode. The insulating intermediate layer may consist for example of a nonwoven glass fabric having a thickness of 0.15 mm.

The reaction product is isolated by distilling off the organic solvent, crystallization, filtration or drying. If there is any discoloration of the reaction solution, a vessel containing active carbon may be interposed after the cell to decolorize the reaction mixture. Since 3,5-cyclohexadiene-1,2-dicarboxylic acid is a very reactive substance, the processing of the reaction mixture (i.e. separation and drying) is advantageously carried out at the lowest possible temperature and short residence times so that discoloration and secondary reactions, for example rearrangements, are avoided. The process may also be made continuous by recycling the distillate and filtrate (i.e. the catholyte freed from solids).

3,5-cyclohexadiene-1,2-trans-dicarboxylic acids and 2,5-cyclohexadiene-1,4-dicarboxylic acids are suitable for the production of lactams, as for example as described in Belgian patent specification No. 663,870. The procedure in the following examples is as follows:

The hydrogenation cell in the continuous experiments (Examples 1 to 3) is a double-walled glass tube which is cooled with water in order to remove heat of reaction. The cathode of raw lead (about 99.99%) is cylindrical and is in contact with the inner wall of the glass tube. It surrounds a cylindrical clay diaphragm which separates the anode chamber from the cathode chamber. The anode consists of a lead tube cooled by water.

The anolyte is 5% aqueous sulfuric acid. The catholyte contains about 20% by weight of o-phthalic acid, about 55% by weight of organic solvent, about 20% by weight of water and about 5% of concentrated sulfuric acid.

The reaction temperature in the cells is from 30° to 50° C. Current densities of from 3 to 25 amperes per sq. dm. have proved to be particularly favorable in the apparatus.

The catholyte is supplied to the bottom of the cell and withdrawn from the top of the cell by means of a metering pump. The organic solvent and water are removed under mild conditions in a rotational evaporator, the dihydrophthalic acid formed being precipitated. The solid product is separated from the residual aqueous sulfuric acid by filtration and the distillate and filtrate are returned to the hydrogenation. The solid product is washed with water and dried.

The following examples illustrate the invention.

EXAMPLE 1

The water-cooled vertical double-walled glass tube described above is used as the hydrogenation cell. The reservoir for the catholyte and the pipe lines supplying it are gently heated. Quantitative data are as follows:

Height of the tubular cell: 57 cm.
Diameter of the tubular cell: 6.5 cm.
Area of cathode surface: 10 sq. dm.
Area of anode surface: 3.1 sq. dm.
Volume of cathode chamber: 1 liter
Reaction temperature: 48° C.
Current density: 15 amperes per sq. dm.
Current conversion: 120%
Anolyte: 5% sulfuric acid
Catholyte: 55% dioxane, 20% water, 5% sulfuric acid and 20% o-phthalic acid
Throughput of catholyte: 1.93 kg. per hour
Conversion of o-phthalic acid: 100%
Yield of 3,5-cyclohexadiene-1,2-dicarboxylic acid: 99.2% of the theory
Space-time yield. 0.387 kg. of 3,5-cyclohexadiene-1,2-dicarboxylic acid per liter of reaction space per hour
Current yield: 82.6%
Content of 2,5-cyclohexadiene-1,2-dicarboxylic acid: <0.5%.

EXAMPLE 2

In a manner analogous to that in Example 1, o-phthalic acid is hydrogenated using dimethylformamide as the organic solvent component. Quantitative data are as follows:

Reaction temperature: 40° C.
Current density: 20 amperes per sq. dm.
Current yield: 130%
Anolyte: 5% aqueous sulfuric acid
Catholyte: 52% dimethylformamide, 18% water, 5% aqueous sulfuric acid, 25% o-phthalic acid
Throughput of catholyte: 1.97 kg. per hour
Conversion of o-phthalic acid: 100%
Yield of 3,5-cyclohexadiene-1,2-dicarboxylic acid: 98.5% of the theory
Space-time yield: 0.469 kg. of 3,5-cyclohexadiene-1,2-dicarboxylic acid per liter of reaction space per hour
Current yield: 75.7%
Content of 2,5-cyclohexadiene-1,2-dicarboxylic acid: <0.5%.

EXAMPLE 3

The following results are obtained by using acetonitrile under the same conditions as in Example 2:

Conversion of o-phthalic acid: 94% of the theory
Yield of 3,5-cyclohexadiene-1,2-dicarboxylic acid: 98.6%
Current yield: 73.3%
Content of 2,5-cyclohexadiene-1,2-dicarboxylic acid: <1%

EXAMPLE 4

A hydrogenation apparatus of polypropylene is used which has the shape of a trough similar to a filter press, and is composed of two units. The first block consists of seven electrodes in series (five bipolar electrodes, six cathodes and six anodes) and the second block consists of three electrodes in series (one bipolar electrode, two cathodes and two anodes). The circuit is shown in "Ullmann's Encykopädie der technischen Chemie," volume 6, pages 464 to 466. The whole apparatus accordingly comprises eight cathodes and eight anodes. The cathode chambers are separated from the anode chambers by cation exchanger membranes based on sulfonated polystyrene such as is known under the registered trademark "Permaplex C 20 ($H^{(+)}$ form). The cathode chambers are connected together by glass tubes. The catholyte is pumped continuously through the eight cathode chambers (in each case being supplied at the bottom and withdrawn at the top), first to the first block of cells and then to the second block of cells. The electrodes are cooled by water. Quantitative data are as follows:

Electrode surface: 170 sq. cm. (14.2 cm. x 12 cm.)
Area of membrane: 170 sq. cm.
Distance between cathode and membrane: 0.2 cm.
Distance between anode and membrane: 1 cm.
Total cathode chamber: 272 ccm.
Current density in first cell unit: 10 amperes per sq. dm.
Current density in second cell unit: 5 amperes per sq. dm.
Reaction temperature: 35° C.
Anolyte: 5% aqueous sulfuric acid
Catholyte: 52% tetrahydrofuran, 18% water, 5% sulfuric acid, 25% o-phthalic acid
Throughput of catholyte: 1.34 kg. per hour
Conversion of o-phthalic acid: 100%
Yield of 3,5-cyclohexadiene-1,2-dicarboylic acid: 98.8% of the theory
Space-time yield: 1.25 kg. of 3,5-cyclohexadiene-1,2-dicarboxylic acid per liter of cathode space per hour
Content of 2,5-cyclohexadiene-1,2-dicarboxylic acid: <0.5%.

We claim:
1. In a process for the production of 3,5-cyclohexadiene-1,2-dicarboxylic acid or 2,5-cyclohexadiene-1,4-dicarboxylic acid by cathodic hydrogenation of o-phthalic acid or terephthalic acid in which an electric current is passed through a dispersion of o-phthalic acid or terephthalic acid in dilute aqueous sulfuric acid as the electrolyte, the improvement which comprises adding to said electrolyte an organic solvent selected from the group consisting of an ether, a carboxylic amide, and a nitrile, and electrolysing at a current density of 1 to 40 A./dm.$^2$ and a temperature of 20°–80° C.

2. A process as claimed in claim 1 in which the concentration of o-phthalic acid or terephthalic acid in the electrolyte is from 5 to 50% by weight.

3. A process as claimed in claim 1 in which the sulfuric acid content of the electrolyte is 0.5 to 10% by weight.

4. A process as claimed in claim 1 in which the content of organic solvent in the electrolyte is 20 to 80%.

5. A process as claimed in claim 4 in which the content of organic solvent in the electrolyte is 40 to 70%.

6. A process as claimed in claim 1 in which the organic solvent is dioxane.

7. A process as claimed in claim 1 in which the organic solvent is dimethyl formamide.

8. A process as claimed in claim 1 in which the organic solvent is tetrahydrofuran.

9. A process as claimed in claim 1 in which the organic solvent is acetonitrile.

10. A process as claimed in claim 1 in which a membrane of an ion exchanger is used as a diaphragm isolating the cathodic hydrogenation.

References Cited

UNITED STATES PATENTS

| | | | |
|---|---|---|---|
| 3,330,745 | 7/1967 | Smets et al. | 204—59 |
| 3,193,477 | 7/1965 | Baizer | 204—73 |
| 2,680,713 | 6/1954 | Lindsey et al. | 204—59 |
| 2,439,425 | 4/1948 | Gresham | 204—72 |

JOHN H. MACK, Primary Examiner

R. L. ANDREWS, Assistant Examiner

PO-1050
(5/69)

UNITED STATES PATENT OFFICE
CERTIFICATE OF CORRECTION

Patent No. 3,542,656      Dated November 24, 1970

Inventor(s) Hubert Suter et al

It is certified that error appears in the above-identified patent and that said Letters Patent are hereby corrected as shown below:

Column 1, line 15, "3,5-cyclohexadine" should read -- 3,5-cyclohexadiene --; line 63, "p-phthalic" should read -- o-phthalic --.

SIGNED AND
SEALED
FEB 9 1971

(SEAL)
Attest:
Edward M. Fletcher, Jr.
Attesting Officer

WILLIAM E. SCHUYLER, JR.
Commissioner of Patents